United States Patent
Leo et al.

(10) Patent No.: US 12,248,123 B2
(45) Date of Patent: Mar. 11, 2025

(54) METHODS OF FORMING AN ANTIREFLECTIVE LAYER ON A COMPLEX SUBSTRATE AND COMPLEX SUBSTRATES HAVING THE ANTIREFLECTIVE LAYER

(71) Applicant: University of Florida Research Foundation, Inc., Gainesville, FL (US)

(72) Inventors: Sin-Yen Leo, Gainesville, FL (US); Peng Jiang, Gainesville, FL (US); Zhuxiao Gu, Gainesville, FL (US)

(73) Assignee: University of Florida Research Foundation, INC., Gainesville, FL (US)

(*) Notice: Subject to any disclaimer, the term of this patent is extended or adjusted under 35 U.S.C. 154(b) by 596 days.

(21) Appl. No.: 16/764,735

(22) PCT Filed: Dec. 19, 2018

(86) PCT No.: PCT/US2018/066349
§ 371 (c)(1),
(2) Date: May 15, 2020

(87) PCT Pub. No.: WO2019/126245
PCT Pub. Date: Jun. 27, 2019

(65) Prior Publication Data
US 2021/0181381 A1    Jun. 17, 2021

Related U.S. Application Data

(60) Provisional application No. 62/607,987, filed on Dec. 20, 2017.

(51) Int. Cl.
G02B 1/118 (2015.01)
C03C 17/00 (2006.01)
(Continued)

(52) U.S. Cl.
CPC ............ *G02B 1/118* (2013.01); *C03C 17/004* (2013.01); *C03C 17/005* (2013.01); *C03C 17/25* (2013.01);
(Continued)

(58) Field of Classification Search
None
See application file for complete search history.

(56) References Cited

U.S. PATENT DOCUMENTS 3,422,535 A    1/1969    Johnson
3,671,105 A    6/1972    Williams et al.
(Continued)

FOREIGN PATENT DOCUMENTS

CN    103935057 A         7/2014
CN    104418509 A    *    3/2015
(Continued)

OTHER PUBLICATIONS

E. Metwalli, D.; et al. "Surface characterizations of mono-, di-, and tri-, aminosilane treated glass substrates", J. Colloid Interf. Sci. 298 (2006) 825-831.
(Continued)

*Primary Examiner* — David Sample
(74) *Attorney, Agent, or Firm* — Thomas | Horstemeyer LLP.

(57) ABSTRACT

Described herein are antireflective layers, methods for forming antireflective layers, and structures including antireflective layers. Methods are included for forming a durable antireflective layer on the surface of a substrate, wherein the substrate has a complex three-dimensional shape, wherein the durable antireflective layer comprises a uniform monolayer of silica nanoparticles interconnected by $SiO_2$, a uniform monolayer of silica nanoparticles bonded to the surface of the substrate, or a combination thereof.

6 Claims, 3 Drawing Sheets

(51) Int. Cl.
*C03C 17/25* (2006.01)
*G02B 1/12* (2006.01)

(52) U.S. Cl.
CPC .......... *G02B 1/12* (2013.01); *C03C 2217/213* (2013.01); *C03C 2217/732* (2013.01); *C03C 2218/111* (2013.01); *C03C 2218/115* (2013.01); *C03C 2218/32* (2013.01)

(56) References Cited

U.S. PATENT DOCUMENTS

| | | | |
|---|---|---|---|
| 4,125,319 A | 11/1978 | Frank et al. |
| 4,340,479 A | 7/1982 | Pall |
| 4,664,748 A | 5/1987 | Ueno et al. |
| 4,781,441 A | 11/1988 | Kanbe et al. |
| 4,810,633 A | 3/1989 | Bauer et al. |
| 5,147,716 A | 9/1992 | Bellus |
| 5,337,018 A | 8/1994 | Yamagishi |
| 5,429,743 A | 7/1995 | Geus et al. |
| 5,529,524 A | 6/1996 | Jones |
| 5,641,332 A | 6/1997 | Faber et al. |
| 5,753,014 A | 5/1998 | Van Rijn |
| 5,939,189 A | 8/1999 | Phillips et al. |
| 5,948,470 A | 9/1999 | Harrison et al. |
| 5,993,661 A | 11/1999 | Ruckenstein et al. |
| 6,044,981 A | 4/2000 | Chu et al. |
| 6,531,304 B1 | 3/2003 | Boennemann et al. |
| 6,565,763 B1 | 5/2003 | Asakawa et al. |
| 6,649,255 B1 | 11/2003 | Fain et al. |
| 6,881,582 B2 | 4/2005 | Ratogi et al. |
| 6,929,764 B2 | 8/2005 | Jiang et al. |
| 6,958,137 B2 | 10/2005 | Lee et al. |
| 7,351,470 B2 | 4/2008 | Draheim et al. |
| 7,630,589 B2 | 12/2009 | Kilic et al. |
| 7,691,325 B2 | 4/2010 | Chopra et al. |
| 7,889,954 B2 | 2/2011 | Sailor et al. |
| 9,233,883 B1 | 1/2016 | Rauscher et al. |
| 9,272,947 B2 | 3/2016 | Baca et al. |
| 10,189,967 B2 | 1/2019 | Jiang et al. |
| 10,700,225 B2 | 6/2020 | Wang et al. |
| 2003/0031438 A1 | 2/2003 | Kambe et al. |
| 2004/0131779 A1 | 7/2004 | Haubrich et al. |
| 2004/0131799 A1 | 7/2004 | Arsenault et al. |
| 2004/0184948 A1 | 9/2004 | Rakow et al. |
| 2005/0147807 A1 | 7/2005 | Haas et al. |
| 2006/0137462 A1 | 6/2006 | Divigalpitiya et al. |
| 2007/0036653 A1 | 2/2007 | Bak et al. |
| 2007/0156079 A1 | 7/2007 | Brown |
| 2007/0206270 A1 | 9/2007 | Iwamatsu et al. |
| 2008/0006574 A1 | 1/2008 | Ramaswamy et al. |
| 2008/0027199 A1 | 1/2008 | Mazurek et al. |
| 2008/0108142 A1 | 5/2008 | Hall et al. |
| 2008/0185498 A1 | 8/2008 | Purdy et al. |
| 2008/0233418 A1 | 9/2008 | Krueger |
| 2008/0309923 A1 | 12/2008 | Falk |
| 2009/0034051 A1 | 2/2009 | Arsenault et al. |
| 2009/0274873 A1 | 11/2009 | Shinotsuka |
| 2010/0051561 A1 | 3/2010 | Lee |
| 2010/0058844 A1 | 3/2010 | Lin et al. |
| 2010/0068168 A1 | 3/2010 | Song et al. |
| 2010/0069726 A1 | 3/2010 | Levinson |
| 2010/0125113 A1 | 5/2010 | Xiao et al. |
| 2010/0150511 A1 | 6/2010 | Arsenault et al. |
| 2010/0155325 A1 | 6/2010 | Zhang et al. |
| 2010/0188732 A1 | 7/2010 | Akashi et al. |
| 2010/0216310 A1 | 8/2010 | Metz et al. |
| 2010/0218716 A1 | 9/2010 | Havens et al. |
| 2010/0235107 A1 | 9/2010 | Fukumura et al. |
| 2010/0244169 A1 | 9/2010 | Maeda et al. |
| 2010/0315703 A1 | 12/2010 | Purdy et al. |
| 2011/0019277 A1 | 1/2011 | Sager et al. |
| 2011/0097814 A1 | 4/2011 | Bommarito et al. |
| 2011/0111173 A1 | 5/2011 | Ogawa et al. |
| 2011/0140106 A1 | 6/2011 | Forbes |
| 2011/0194261 A1 | 8/2011 | Tanaka et al. |
| 2011/0233476 A1 | 9/2011 | Arsenault |
| 2011/0255035 A1 | 10/2011 | Wu |
| 2012/0051489 A1 | 3/2012 | Varanasi et al. |
| 2012/0073388 A1 | 3/2012 | Chibante |
| 2012/0074612 A1 | 3/2012 | Scrivens et al. |
| 2012/0152338 A1 | 6/2012 | Ha et al. |
| 2012/0225517 A1 | 9/2012 | Zhang et al. |
| 2012/0262789 A1 | 10/2012 | Xie et al. |
| 2012/0281292 A1 | 11/2012 | Baca et al. |
| 2012/0293802 A1 | 11/2012 | Ozin et al. |
| 2012/0313205 A1 | 12/2012 | Haddad et al. |
| 2012/0321810 A1 | 12/2012 | Tebby et al. |
| 2013/0078750 A1 | 3/2013 | Yeo et al. |
| 2013/0115441 A1* | 5/2013 | Bookbinder ........ C23C 18/1212 977/734 |
| 2013/0160849 A1* | 6/2013 | Yamanishi ............ H01L 31/202 136/258 |
| 2013/0199995 A1 | 8/2013 | Jiang et al. |
| 2013/0215513 A1 | 8/2013 | Liang et al. |
| 2013/0222881 A1 | 8/2013 | Aizenberg et al. |
| 2013/0258483 A1 | 10/2013 | Pett et al. |
| 2013/0320467 A1 | 12/2013 | Buchanan et al. |
| 2013/0340824 A1 | 12/2013 | Oh et al. |
| 2014/0017145 A1 | 1/2014 | Aizenberg et al. |
| 2014/0065362 A1* | 3/2014 | Park .................. C23C 14/3464 428/141 |
| 2014/0106468 A1 | 4/2014 | Boersma |
| 2014/0166100 A1 | 6/2014 | Watanabe et al. |
| 2014/0319524 A1 | 10/2014 | Phillips et al. |
| 2015/0035269 A1 | 2/2015 | Hooper et al. |
| 2015/0064405 A1* | 3/2015 | Koch, III ................ G02B 1/118 428/149 |
| 2015/0157453 A1 | 6/2015 | Nazirizadeh et al. |
| 2015/0276989 A1 | 10/2015 | Han et al. |
| 2016/0032141 A1 | 2/2016 | Maghsoodi et al. |
| 2016/0254394 A1* | 9/2016 | Finarov .......... H01L 31/022433 136/244 |
| 2016/0254395 A1* | 9/2016 | Jiang ..................... G02B 1/113 257/76 |
| 2016/0326334 A1 | 11/2016 | Jiang et al. |
| 2017/0209045 A1 | 7/2017 | Choo et al. |
| 2017/0215790 A1 | 8/2017 | Levinson et al. |
| 2017/0222077 A1* | 8/2017 | Yang ................ H01L 31/03926 |
| 2017/0225395 A1 | 8/2017 | Boydston et al. |
| 2017/0271259 A1 | 9/2017 | Hotta et al. |

FOREIGN PATENT DOCUMENTS

| | | | | |
|---|---|---|---|---|
| CN | 105036068 A | 11/2015 | | |
| EP | 0341675 A2 | 11/1989 | | |
| EP | 2220520 A2 | 8/2010 | | |
| EP | 2484726 A1 * | 8/2012 | ............... | B05D 5/08 |
| JP | 2008088031 A * | 4/2008 | | |
| WO | 9820388 A1 | 5/1998 | | |
| WO | 2000010934 A1 | 3/2000 | | |
| WO | 2002073699 A1 | 11/2002 | | |
| WO | 2007070486 A2 | 6/2007 | | |
| WO | 2008060322 A2 | 5/2008 | | |
| WO | 2010007853 A1 | 1/2010 | | |
| WO | 2015066337 A1 | 5/2015 | | |
| WO | 2018213570 A2 | 11/2018 | | |

OTHER PUBLICATIONS

Esquivel-Upshaw, J. F., et al. "Surface degradation of dental ceramics as a function of environmental pH." Journal of dental research 92.5 (2013): 467-471.

Esquivel-Upshaw, Josephine F., et al. "In Vivo Wear of Enamel by a Lithia Disilicate—Based Core Ceramic Used for Posterior Fixed Partial Dentures: First-Year Results." International Journal of Prosthodontics 19.4 (2006).

Esquivel-Upshaw, Josephine F., et al. "Resistance to staining, flexural strength, and chemical solubility of core porcelains for all-ceramic crowns." International Journal of Prosthodontics 14.3 (2001).

(56) References Cited

OTHER PUBLICATIONS

Esquivel-Upshaw, Josephine, et al. "Randomized, controlled clinical trial of bilayer ceramic and metal-ceramic crown performance." Journal of Prosthodontics: Implant, Esthetic and Reconstructive Dentistry 22.3 (2013): 166-173.

Fang et al., "Reconfigurable photonic crystals enabled by pressure-responsive shape-memory polymers", Nature Communications 2015: 1-8.

Fang, Y.; et al. Chromogenic Photonic Crystals Enabled by Novel Vapor-Responsive Shape Memory Polymers. Adv. Mater. 2015, 27, 3696-3704.

Fang, Y.; et al. Reconfigurable Photonic Crystals Enabled by Multistimuli-Responsive Shape Memory Polymers Possessing Room Temperature Shape Processability. ACS Appl. Mater. Interfaces 2017, 9, 5457-5467.

Felton et al., Soft Matter "Self-folding with shape memory composites", Soft Matter, 2013, 9, 7688-7694.

Fenzl et al., "Photonic Crystals for Chemical Sensing and Biosensing", Angewandte Chemie Ed. 2015, 53: 3318-3335.

Fischer, H.; et al. "Effect of surface roughness on flexural strength of veneer ceramics." Journal of Dental Research 82.12 (2003): 972-975.

Flannery, Anthony F., et al. "PECVD silicon carbide as a chemically resistant material for micromachined transducers." Sensors and Actuators A: Physical 70.1-2 (1998): 48-55.

Fu, Q. Q.; et al. Hierarchically Structured Photonic Crystals for Integrated Chemical Separation and Colorimetric Detection. Nanoscale 2017, 9, 2457-2463.

Fudouzi et al., "Colloidal Crystals with Tunable Colors and Their Use as Photonic Papers", Langmuir 2003, 19: 9653-9660.

G. Zhou, J. He, J. "Antireflective coatings on Fresnel lenses by spin-coating of solid silica nanoparticles", Nanosci. Nanotechnol. 13 (2013) Abstract.

G.M. Nogueira, D. Banerjee, R.E. Cohen, M.F. Rubner, "Spray-Layer-by-Layer Assembly Can More Rapidly Produce Optical-Quality Multistack Heterostructures", Langmuir 27 (2011) 7860-7867.

Ge et al., "Highly Tunable Superparamagnetic Colloidal Photonic Crystals", Angew. Chem. Int. Ed. 2007, 46: 7428-7431.

Ge et al., "Rewritable Photonic Paper with Hygroscopic Salt Solution as Ink", Advanced Materials 2009, 21: 4259-4264.

Ge, J. P.; et al. Responsive Photonic Crystals. Angew. Chem. Int. Ed. 2011, 50, 1492-1522.

Gemici et al., "Targeted Functionalization of Nanoparticle Thin Films via Capillary Condensation", Nano Letters 2009, 9, 3: 1064-1070.

Gourevich, I.; et al Nanostructured Material for Optical Data Storage and Security Labeling. Chem. Mater. 2004, 16, 1471-1479.

Gourevich, Ilya, et al. "Multidye nanostructured material for optical data storage and security labeling." Chemistry of materials 16.8 (2004): 1472-1479.

Zhao, Q.; et al. Shape Memory Polymer Network with Thermally Distinct Elasticity and Plasticity. Sci. Adv. 2016, 2, e1501297.

Grigoras et al., Fabrication of porous membrane filter from p-type silicon, Physica Status Solidi (a) 202(8): 1624-1628.

Gu et al., "Water-triggered shape memory of multiblock thermoplastic polyurethanes (TPUs)", RSC Adv. 2013, 3: 15783-15791.

Gugliuzza et al., "A review on membrane engineering for innovation in wearable fabrics and protective textiles", Journal of Membrane Science 446(2013): 350-375.

H. Fudouzi, M. Kobayashi, N. Shinya, "Assembly of Microsized Colloidal Particles on Electrostatic Regions Patterned through Ion Beam Irradiation", Langmuir 18 (2002) 7648-7652.

H. Jiang, K. Yu, Y.C. Wang, "Antireflective structures via spin casting of polymer latex", Opt. Lett. 32 (2007) 575-577.

H. Nagel, A. Metz, R. Hezel, "Porous SiO2 films prepared by remote plasma-enhanced chemical vapour deposition—a novel antireflection coating technology for photovoltaic modules", Sol. Energ. Mater. Sol. C. 65 (2001) 71-77.

H. Shimomura, Z. Gemici, R.E. Cohen, M.F. Rubner, "Layer-by-Layer-Assembled High-Performance Broadband Antireflection Coatings", ACS Appl. Mater. Interface 2 (2010) 813-820.

Zhao, Q.; et al. Recent Progress in Shape Memory Polymer: New Behavior, Enabling Materials, and Mechanistic Understanding. Prog. Polym. Sci. 2015, 49-50, 79-120.

H.Y. Koo, D.K. Yi, S.J. Yoo, D.Y. Kim, "A Snowman-like Array of Colloidal Dimers for Antireflecting Surfaces** ", Adv. Mater. 16 (2004) 274-277.

Habault et al., "Light-triggered self-healing and shape-memory polymers", Chem. Soc. Rev. 2013, 42: 7244-7256.

Han et al., "Full Color Tunable Photonic Crystal from Crystalline Colloidal Arrays with an Engineered Photonic Stop-Band", Adv. Mater. 2012, 24,: 6438-6444.

Han, H; et al. "Metal-assisted chemical etching of silicon and nanotechnology applications" ScienceDirect 2014, 9, 271-304.

Zhang, Haixia, et al. "Application of PECVD SiC in glass micromachining." Journal of Micromechanics and Microengineering 17.4 (2007): 775.

Zhang, G. G.; et al. Unusual Aspects of Supramolecular Networks: Plasticity to Elasticity, Ultrasoft Shape Memory, and Dynamic Mechanical Properties. Adv. Funct. Mater. 2016, 26, 931-937.

Hatton et al., "Assembly of large-area, highly ordered, crack-free inverse opal films", PNAS 2010, vol. 107, 23: 10354-10359.

Heintze, Siegward D; et al. "Survival of zirconia-and metal-supported fixed dental prostheses: a systematic review." International Journal of Prosthodontics 23.6 (2010).

Heo, Y.; et al. Controlled Insertion of Planar Defect in Inverse Opals for Anticounterfeiting Applications. ACS Appl. Mater. Interfaces 2017, 9, 43098-43104.

Heo, Y.; et al. Lithographically Encrypted Inverse Opals for Anti-Counterfeiting Applications. Small 2016, 12, 3819-3826.

Herrmann, M. "Corrosion of silicon nitride materials in aqueous solutions." Journal of the American Ceramic Society 96.10 (2013): 3009-3022.

Herrmann, M., et al. "Corrosion of silicon nitride materials in acidic and basic solutions and under hydrothermal conditions." Journal of the European Ceramic Society 23.4 (2003): 585-594.

Heuwers et al., "Shape-Memory Natural Rubber: An Exceptional Material for Strain and Energy Storage", Macromolecular Chemistry and Physics 2013, 214: 912-923-1130.

Heuwers et al., "Stress-Induced Stabilization of Crystals in Shape Memory Natural Rubber", Macromolecular Rapid Communications 2013, 34: 180-184.

Holtz et al., "Polymerized colloidal crystal hydrogel films as intelligent chemical sensing materials", Nature 1997, 389: 829-832.

Hou, J.; et al. Four-Dimensional Screening Anti-Counterfeiting Pattern by Inkjet Printed Photonic Crystals. Chem.—An Asian J. 2016, 11, 2680-2685.

Hu, H. B.; et al. Magnetically Responsive Photonic Watermarks on Banknotes. J. Mater. Chem. C 2014, 2, 3695-3702.

Hu, H.; et al. Photonic Anti-Counterfeiting Using Structural Colors Derived from Magnetic-Responsive Photonic Crystals with Double Photonic Bandgap Heterostructures. J. Mater. Chem. 2012, 22, 11048-11053.

Huang et al., "Water-driven programmable polyurethane shape memory polymer: Demonstration and mechanism", Applied Physics Letters 2005, 86: 1-3.

Huang, Z; et al. "Metal-Assisted chemical etching of silicon: a review" Advanced Materials 2011, 23, 285-308.

International Preliminary Report on Patentability dated May 10, 2013 for PCT Patent Application No. PCT/US2011/057484.

International Search Report and Written Opinion for PCT/US2014/063163 mailed Jun. 25, 2015.

International Search Report and Written Opinion issued in PCT/US2017/046886 on Oct. 20, 2017.

International Search Report and Written Opinion mailed on Jun. 26, 2012 for PCT Patent Application No. PCT/US2011/057484.

International Search Report for International Application No. PCT/US2018/033173, dated Nov. 21, 2018.

International Search Report for International Application No. PCT/US2019/017862, mailed Jan. 21, 2020.

(56) References Cited

OTHER PUBLICATIONS

International Search Report for PCT/US19/38193 of Sep. 5, 2019 [222107-2210].

International Search Report for PCT/US2018/066234 mailed Mar. 25, 2019.

International Search Report for PCT/US2018/066353 of Mar. 15, 2019.

Ionov, Leonid. "Soft microorigami: self-folding polymer films." Soft Matter 7.15 (2011): 6786-6791.

J. Aizenberg, P.V. Braun, P. Wiltzius, "Patterned Colloidal Deposition Controlled by Electrostatic and Capillary Forces", Phys. Rev. Lett. 84 (2000) 2997-3000.

Zhang et al., Fabrication and bioseparation studies of adsorptive membranes/felts made from electrospun cellulose acetate nanofibers, Journal of Membrane Science 2008, 319(1-2):176-184.

J. Tien, A. Terfort, G.M. Whitesides, "Microfabrication through Electrostatic Self-Assembly", Langmuir 13 (1997) 5349-5355.

J.-H. Kim, S. Fujita, S. Shiratori, "Design of a thin film for optical applications, consisting of high and low refractive index multilayers, fabricated by a layer-by-layer self-assembly method", Colloid Surf. Aspects 284-285 (2006) 290-294.

J.A. Hiller, J.D. Mendelsohn, M.F. Rubner, "Reversibly erasable nanoporous anti-reflection coatings from bolyelectrolyte multilayers", Nat. Mater. 1 (2002) 59-63.

J.Q. Xi, M.F. Schubert, J.K. Kim, E.F. Schubert, M. Chen, S.-Y. Lin, LiuW, J.A. Smart, "Optical thin-film materials with low refractive index for broadband elimination of Fresnel reflection", Nat. Photon. 1 (2007) 176-179.

Jang et al., "Combining Pattern Instability and Shape-Memory Hysteresis for Phononic Switching", Nano Lett. 2009, 9, 5: 2113-2119.

Jiang et al., "Template-Directed Preparation of Macroporous Polymers with Oriented and Crystalline Arrays of Voids", J. Am. Chem. Soc. 1999, 121: 11630-11637.

Yunus, S.; et al. Diffusion of Oligomers from Polydimethylsiloxane Stamps in Microcontact Printing: Surface Analysis and Possible Application. Surf. Interface Anal. 2007, 39, 922-925.

Jiang, P.; et al. Single-Crystal Colloidal Multilayers of Controlled Thickness. Chem. Mater. 1999, 11, 2132-2140.

Joannopoulos, J. D.; et al. Photonic Crystals: Molding the Flow of Light. Princeton University Press: Princeton, 1995.

K. Askar, B.M. Phillips, X. Dou, J. Lopez, C. Smith, B. Jiang, P. Jiang, "Self-assembled nanoparticle antiglare coatings", Opt. Lett. 37 (2012) 4380-4382.

K.M. Yeung, W.C. Luk, K.C. Tam, C.Y. Kwong, M.A. Tsai, H.C. Kuo, A.M.C. Ng, A.B. Djurisic, "2-Step self-assembly method to fabricate broadband omnidirectional antireflection coating in large scale", Sol Energ Mater Sol C 95 (2011) 699-703.

Kang et al., "Broad-wavelength-range chemically tunable blockcopolymer photonic gels", Nature Materials 2007, 6: 957-960.

Karrock, Torben; et al. "Pressure sensor based on flexible photonic crystal membrane." Biomedical optics express 6.12 (2015): 4901-4911.

Keller, K.; et al. Inkjet Printing of Multicolor Daylight Visible Opal Holography. Adv. Funct. Mater. 2018, 28, 1706903.

Kloxin et al., "Covalent adaptable networks: smart, reconfigurable and responsive network systems", Chem. Soc. Rev. 2013, 42: 7161-7173.

Kluhr et al., Partially Oxidized Macroporous Silicon: A Three-Dimensional Photonic Matrix for Microarray Applications, Advanced Materials 2006, 18(23): 3135-3139.

Kobatake; et al. "Rapid and reversible shape changes of molecular crystals on photoirradiation" vol. 446, Apr. 12, 2007, doi: 10.1038/nature05669, pp. 1-4.

Koerner et al., "Remotely actuated polymer nanocomposites—stress-recovery of carbon-nanotube-filled thermoplastic elastomers", nature materials 2004, 3: 115-120.

Kukiattrakoon, Boonlert; et al. "Chemical durability and microhardness of dental ceramics immersed in acidic agents." Acta Odontologica Scandinavica 68.1 (2010): 1-10.

Kukiattrakoon, Boonlert; et al. "Degradability of fluorapatite-leucite ceramics in naturally acidic agents." Dental materials journal (2010): 1008310070-1008310070.

Kukiattrakoon, Boonlert; et al. "Effect of acidic agents on surface roughness of dental ceramics." Dental research Journal 8.1 (2011): 6.

Kukiattrakoon, Boonlert; et al. "The effect of acidic agents on surface ion leaching and surface characteristics of dental porcelains." The journal of prosthetic dentistry 103.3 (2010): 148-162.

Kukiattrakoon, Boonlert; et al. "Vicker's microhardness and energy dispersive x-ray analysis of fluorapatite-leucite and luorapatite ceramics cyclically immersed in acidic agents." Journal of oral science 51.3 (2009): 443-450.

Kunzelman et al., "Shape memory polymers with built-in threshold temperature sensors", Journal of Materials Chemistry 2008, 18: 1082-1086.

Kuswandi; et al., "A Simple Visual Ethanol Biosensor Based on Alcohol Oxidase Immobilized onto Polyaniline Film for Halal Verification of Fermented Beverage Samples", Feb. 2014, Sensors, 14(2):2135-2149. (Year: 2014).

Kuznetsov, A. I.; et al. Optically Resonant Dielectric Nanostructures. Science 2016, 354, 2472.

L. Ionov, "3D Microfabrication using Stimuli-Responsive Self-Folding Polymer Films", Polymer Reviews, 2013, 53: 92-107.

Lee, E.; et al. Bio-Inspired Responsive Polymer Pillar Arrays. MRS Commun. 2015, 5, 97-114.

Lee, H. S.; et al. Colloidal Photonic Crystals toward Structural Color Palettes for Security Materials. Chem. Mater. 2013, 25, 2684-2690.

Lee, J. N.; et al. Solvent Compatibility of Poly(Dimethylsiloxane)-Based Microfluidic Devices. Anal. Chem. 2003, 75, 6544-6554.

Lendlein et al., "Biodegradable, Elastic Shape-Memory Polymers for Potential Biomedical Applications", Science 2002, vol. 296: 1673-1676.

Ye et al., "Invisible Photonic Prints Shown by Deformation", Advanced Functional Materials 2014, 24: 6430-6438.

Lendlein, A.; et al. Shape-Memory Polymers. Angew. Chem. Int. Ed. 2002, 41, 2034-2057.

Leng et al., "Shape-Memory Polymers—A Class of Novel Smart Materials", MRS Bulletin 2009, 34: 848-855, www.mrs.org/bulletin.

Leng et al., "Synergic effect of carbon black and short carbon fiber on shape memory polymer actuation by electricity", Journal of Applied Physics 2008, 104: 1-4.

Leo, S. Y.; et al. Chromogenic Photonic Crystal Sensors Enabled by Multistimuli-Responsive Shape Memory Polymers. Small 2018, 14, 1703515.

Li, H. L.; et al. Superoleophilic and Superhydrophobic Inverse Opals for Oil Sensors. Adv. Funct. Mater. 2008, 18, 3258-3264.

International Search Report for PCT/US2018/066349 of Mar. 15, 2019.

Li, P.; et al. Novel Programmable Shape Memory Polystyrene Film: A Thermally Induced Beam-Power Splitter. Sci. Rep. 2017, 7, 44333.

Li, Y., et al. "Broadband near-infrared antireflection coatings fabricated by three-dimensional direct laser writing." Optics letters 43.2 (2018): 239-242.

Lishchuk, P; et al. "Photoacoustic characterization of nanowire arrays formed by metal-assisted chemical etching of crystalline silicon substrates with different doping level" ScienceDirect 2019, 131-136.

Liu et al., "Review of progress in shape-memory polymers", J. Mater. Chem., 2007, 17: 1543-1558.

Louette, P.; et al. Poly(Dimethyl Siloxane) (Pdms) Xps Reference Core Level and Energy Loss Spectra Surf. Sci. Spectra 2006, 12, 38-43.

Lv et al., "Shape-Memory Polymer in Response to Solution", Advanced Engineering Materials 2008, 10, No. 6: 592-595.

Lv, T.; ; et al. Superhydrophobic Surface with Shape Memory Micro/Nanostructure and Its Application in Rewritable Chip for Droplet Storage. ACS Nano 2016, 10, 9379-9386.

(56) References Cited

OTHER PUBLICATIONS

M. Ibn-Elhaj, M. Schadt, "Optical polymer thin films with isotropic and anisotropic nano-corrugated surface topologies", Nature 410 (2001) 796-799.

M. Kursawe, R. Anselmann, V. Hilarius, G. Pfaff, "Nano-Particles by Wet Chemical Processing in Commercial Applicaitons", J. Sol-Gel Sci. Technol. 33 (2005) 71-74.

M. Sakhuja, J. Son, L.K. Verma, H. Yang, C.S. Bhatia, A.J. Danner, "Omnidirectional study of nanostructured glass packaging for solar modules", Prog. Photovol. 22 (2014) 356-361.

M.F. Schubert, F.W. Mont, S. Chhajed, D.J. Poxson, J.K. Kim, E.F. Schubert, "Design of multilayer antireflection coatings made from co-sputtered and low-refractive-index materials by genetic algorithm", Opt. Exp. 16 (2008) 5290-5298.

M.G. Moharam, D.A. Pommet, E.B. Grann, T.K. Gaylord, "Stable implementation of the rigorous coupled-wave analysis for surface-relief gratings: enhanced transmittance matrix approuch", J. Opt. Soc. Am. A 12 (1995) 1077-1086.

M.I. Dafinone, G. Feng, T. Brugarolas, K.E. Tettey, D. Lee, "Mechanical Reinforcement of Nanoparticle Thin Films Using Atomic Layer Deposition", ACS Nano 5 (2011) 5078-5087.

M.S. Park, J.K. Kim, "Porous Structures of Polymer Films Prepared by Spin Coating with Mixed Solvents under Humid Condition", Langmuir 22 (2006) 4594-4598.

Maitland et al., "Photothermal Properties of Shape Memory Polymer Micro-Actuators for Treating Stroke", Lasers in Surgery and Medicine (2002) 30:1-11.

Mao, D.; et al. Design of Nano-Opto-Mechanical Reconfigurable Photonic Integrated Circuit. J. Lightwave Technol. 2013, 31, 1660-1669.

Mason et al., "Correlation between bulk morphology and luminescence in porous silicon investigated by pore collapse resulting from drying", Thin Solid Films 2002, 406: 151-158.

Mata, A.; et al. Characterization of Polydimethylsiloxane (Pdms) Properties for Biomedical Micro/Nanosystems. Biomed. Microdevices 2005, 7, 281-293.

Mather et al., "Shape Memory Polymer Research", Annu. Rev. Mater. Res. 2009. 39: 445-471.

Yoon, B.; et al., Recent Functional Material Based Approaches to Prevent and Detect Counterfeiting. J. Mater. Chem. C 2013, 1, 2388-2403.

McDonald, J. C.; et al. Poly(Dimethylsiloxane) as a Material for Fabricating Microfluidic Devices. Acc. Chem. Res. 2002, 35, 491-499.

Meng et al., "A Brief Review of Stimulus-active Polymers Responsive to Thermal, Light, Magnetic, Electric, and Water/Solvent Stimuli", Journal of Intelligent Material Systems and Structures, vol. 21—Jun. 2010: 859-885.

Meng et al., "Various shape memory effects of stimuli-responsive shape memory polymers", Smart Materials and Structures 2013, 22: 1-23.

Meng, Y.; et al. Patterned and Iridescent Plastics with 3d Inverse Opal Structure for Anticounterfeiting of the Banknotes. Adv. Opt. Mater. 2018, 6, 1701351.

Meng, Z. P.; et al. Structurally Colored Polymer Films with Narrow Stop Band, High Angle-Dependence and Good Mechanical Robustness for Trademark Anti-Counterfeiting. Nanoscale 2018, 10, 14755-14762.

Metwalli, E., et al. "Surface characterizations of mono-, di-, and tri-aminosilane treated glass substrates." Journal of colloid and interface science 298.2 (2006): 825-831.

Metzger et al., "Mechanical Properties of Mechanical Actuator for Treating Ischemic Stroke", Biomedical Microdevices 2002, 4:2: 89-96.

Milleding, Percy, et al. "Surface energy of non-corroded and corroded dental ceramic materials before and after contact with salivary proteins." European journal of oral sciences 107.5 (1999): 384-392.

Mittleman, D. M.; et al. Optical Properties of Planar Colloidal Crystals: Dynamical Diffraction and the Scalar Wave Approximation. J. Chem. Phys. 1999, 111, 345-354.

Miyazaki, Takashi, et al. "Current status of zirconia restoration." Journal of prosthodontic research 57.4 (2013): 236-261.

Mohr, Gerhard J., Daniel Citterio, and Ursula E. Spichiger-Keller. "Development of chromogenic reactands for optical sensing of alcohols." Sensors and Actuators B: Chemical 49.3 (1998): 226-234.

Moirangthem, M.; et al. An Optical Sensor Based on a Photonic Polymer Film to Detect Calcium in Serum. Adv. Funct. Mater. 2016, 26, 1154-1160.

Moirangthem, M.; et al. Photonic Shape Memory Polymer with Stable Multiple Colors. ACS Appl. Mater. Interface 2017, 9, 32161-32167.

Munakata, et al., Three-dimensionally ordered macroporous polyimide composite membrane with controlled pore size for direct methanol fuel cells, Journal of Power Sources 2008, 178(2): 596-602.

Nam, H.; et al. Inkjet Printing Based Mono-Layered Photonic Crystal Patterning for Anti-Counterfeiting Structural Colors. Sci. Rep. 2016, 6, 30885.

Nguyen et al., "Modeling the Relaxation Mechanisms of Amorphous Shape Memory Polymers", M. L. Chambers, Adv. Mater. 2010, 22: 3411-3423.

Ogawa, Yudai, et al. "Organic transdermal iontophoresis patch with built-in biofuel cell." Advanced healthcare materials 4.4 (2015): 506-510.

Pan et al., "Response of inverse-opal hydrogels to alcohols", Journal of Materials Chemistry 2012, 22: 2018-2025.

Park, H. G.; et al. Electrically Driven Single-Cell Photonic Crystal Laser. Science 2004, 305, 1444-1447.

Park, Wounjhang; et al. "Mechanically tunable photonic crystal structure." Applied Physics Letters 85.21 (2004): 4845-4847.

Peng, C. Y.; et al. Flexible Photonic Crystal Material for Multiple Anticounterfeiting Applications. ACS Appl. Mater. Interfaces 2018, 10, 9858-9864.

Pfeiffer, Kristin, et al. "Antireflection coatings for strongly curved glass lenses by atomic layer deposition." Coatings 7.8 (2017): 118.

Pham, H. H.; et al. Multidye Nanostructured Material for Optical Data Storage and Security Data Encryption. Adv. Mater. 2004, 16, 516-520.

Phillips; et al "Biomimetic broadband antireflection gratings on solar-grade multicrystalline silicon wafers" Applied Physics Letters; Nov. 9, 2011, vol. 99, pp. 191103 (1)-(3).

Pinto, Marcelo M., et al. "Influence of pH on slow crack growth of dental porcelains." dental materials 24.6 (2008): 814-823.

Potyrailo et al., "Morpho butterfly wing scales demonstrate highly selective vapour response", Nature photonics 2007, 1: 123-128.

Preis, Verena, et al. "Wear performance of dental ceramics after grinding and polishing treatments." Journal of the mechanical behavior of biomedical materials 10 (2012): 13-22.

Quitmann et al., "Environmental Memory of Polymer Networks under Stress", Adv. Mater. 2014, 26: 3441-3444.

Raigrodski, Ariel J.; et al. "The safety and efficacy of anterior ceramic fixed partial dentures: a review of the literature." The journal of prosthetic dentistry 86.5 (2001): 520-525.

Rosenstiel, S. F., et al. "Strength of a dental glass-ceramic after surface coating." Dental Materials 9.4 (1993): 274-279.

Cai, Z. Y.; et al. A Photonic Crystal Protein Hydrogel Sensor for Candida Albicans. Angew. Chem. Int. Ed. 2015, 54, 13036-13040.

Velev, O. D.; et al. Materials Fabricated by Micro- and Nanoparticle Assembly—the Challenging Path from Science to Engineering. Adv. Mater. 2009, 21, 1897-1905.

"Light" Wikipedia https://en.wikipedia.orgiwiindex.php?title=Light &oldid=797818857 (accessed Feb. 22, 2019).

"Using polyimide tape to mask against reactive-ion etching" Tech Briefs, 2002 (accessed Feb. 22, 2019).

A. Deak, B. Bancsi, A.L. Toth, A.L. Kovacs, Z. Horvolgyi, "Complex Langmuir-Blodgett films from silica nanoparticles: An optical spectroscopy study", Colloid Surf. A 278 (2006) 10-16.

(56) References Cited

OTHER PUBLICATIONS

A. Deak, I. Szekely, E. Kalman, Z. Keresztes, A.L. Kovacs, Z. Horvolgyi, "Nanostructured silica Langmuir-Blodgett films with antireflective properties prepared on glass substrates", Thin Solid Films 484 (2005) 310-317.
A. Gombert, B. Blasi, C. Buhler, P. Nitz, J. Mick, W. Hossfeld, M. Niggemann, "Some application cases and related manufacturing techniques for optically functional microstructures on large areas", Opt. Eng. 43 (2004) 2525-2533.
A. Gombert, W. Glaubitt, K. Rose, J. Dreibholz, B. Bläsi, A. Heinzel, D. Sporn, W. Döll, V. Wittwer, "Subwavelength-structured antireflective surfaces on glass", Thin Solid Films 351 (1999) 73-78.
Zhong, K.; et al. Instantaneous, Simple, and Reversible Revealing of Invisible Patterns Encrypted in Robust Hollow Sphere Colloidal Photonic Crystals. Adv. Mater. 2018, 30, 1707246.
Zhao, Y.; et al Bio-Inspired Variable Structural Color Materials. Chem. Soc. Rev. 2012, 41, 3297-3317.
Aguirre, C. I.; et al. Tunable Colors in Opals and Inverse Opal Photonic Crystals. Adv. Funct. Mater. 2010, 20, 2565-2578.
Aksoy, Gökhan, et al. "Effect of various treatment and glazing (coating) techniques on the roughness and wettability of ceramic dental restorative surfaces." Colloids and surfaces B: Biointerfaces 53.2 (2006): 254-259.
Al-Marzok, Maan; et al. "The effect of the surface roughness of porcelain on the adhesion of oral *Streptococcus mutans*." J Contemp Dent Pract 10.6 (2009): E017-24.
Arsenault et al., "From colour fingerprinting to the control of photoluminescence in elastic photonic crystals", nature materials 2006, 5: 179-184.
Asher et al., "Photonic Crystal Carbohydrate Sensors: Low Ionic Strength Sugar Sensing", J. Am. Chem. Soc. 2003, 125: 3322-3329.
B.-T. Liu, Y.-T. Teng, R.-H. Lee, W.-C. Liaw, C.-H. Hsieh, "Strength of the interactions between light-scattering particles and resins affects the haze of anti-glare films", Colloid Surf. A 389 (2011) 138-143.
B.E. Yoldas, D.P. Partlow, "Formation of Broad Band Antireflective Coatings on Fused Silica for High Power Laser Applications", Thin Solid Films 129 (1985) 1-14.
B.G. Prevo, E.W. Hon, O.D. Velev, "Assembly and characterization of colloid-based antireflective coatings on multicrystalline silicon solar cells", J. Mater. Chem. 17 (2007) 791-799.
B.G. Prevo, O.D. Velev, "Controlled, Rapid Deposition of Structured Coatings from Micro- and Nanoparticle Suspensions", Langmuir 20 (2004) 2099-2107.
B.T. Liu, W.D. Yeh, "Antireflective surface fabricated from colloidal silica nanoparticles", Colloid Surf. A 356 (2010) 145-149.
B.T. Liu, W.D. Yeh, "Reflective properties of nanoparticle-arrayed surfaces", Thin Solid Films 518 (2010) 6015-6021.
B.T. Liu; et al. "A novel method to control inner and outer haze of an anti-glare film by surface modification of light-scattering particles", J. Colloid Interf. Sci. 350 (2010) 421-426.
Bartlett, D. W., et al. "The association of tooth wear, diet and dietary habits in adults aged 18-30 years old." Journal of dentistry 39.12 (2011): 811-816.
Behl et al., "Multifunctional Shape-Memory Polymers", Adv. Mater. 2010, 22: 3388-3410.
Bertone et al., "Thickness Dependence of the Optical Properties of Ordered Silica-Air and Air-Polymer Photonic Crystals", Physical Review Letters 1999, 83, 2: 300-303.
Boyle, B. M.; et al. Structural Color for Additive Manufacturing: 3d-Printed Photonic Crystals from Block Copolymers. ACS Nano 2017, 11, 3052-3058.
Burgess et al., "Structural colour in colourimetric sensors and indicators", Journal of Materials Chemistry C 2013, 1: 6075-6086.
Burgess, I. B.; et al. Encoding Complex Wettability Patterns in Chemically Functionalized 3d Photonic Crystals. J. Am. Chem. Soc. 2011, 133, 12430-12432.
Butler, Craig J., et al. "Effect of fluoride and 10% carbamide peroxide on the surface roughness of low-fusing and ultra low-fusing porcelain." The Journal of prosthetic dentistry 92.2 (2004): 179-183.
C. Heine, R.H. Morf, "Submicrometer gratings for solar energy applications", Appl. Opt. 34 (1995) 2476-2482.
C. Yakacki, "Shape-Memory and Shape-Changing Polymers", Polymer Reviews, 2013, 53: 1-5.
C.M. Kennemore Iii, U.J. Gibson, "Ion beam processing for coating MgF2 onto ambient temperature substrates", Appl. Opt. 23 (1984) 3608-3611.
C.S. Thompson, R.A. Fleming, M. Zou, "Solar Energy Materials & Solar Cells", Sol Energ Mater Sol C 115 (2013) 108-113.
Cansizoglu, H; et al. "Optical absorption properties of semiconducting nanostructures with different shapes" Advanced Optical Materials 2013, 1, 156-166. (Year: 2013).
Cao, Z; et al. "Study on the impact of silicon doping level on the trench profile using metal-assisted chemical etching" 2016, vol. 12,742-746.
Ccahuana, Vanessa ZS, et al. "Surface degradation of glass ceramics after exposure to acidulated phosphate fluoride." Journal of Applied Oral Science 18.2 (2010): 155-165.
Chan et al., "Mechanochromic Photonic Gels", Advanced Materials 2013, 25: 3934-3947.
Chen; et al. "Directed water shedding on high-aspect-ratio shape memory polymer micropillar arrays" Advanced Materials, 2014, pp. 1283-1288, vol. 26, doi: 10.1002/adma.201304030.
Cho, Y.; et al. Elastoplastic Inverse Opals as Power-Free Mechanochromic Sensors for Force Recording. Adv. Funct. Mater. 2015, 25, 6041-6049.
Creugers, Nico HJ; et al. "A meta-analysis of durability data on conventional fixed bridges." Community Dentistry and Oral Epidemiology 22.6 (1994): 448-452.
Cui et al., "Inverse Opal Spheres Based on Polyionic Liquids as Functional Microspheres with Tunable Optical Properties and Molecular Recognition Capabilities", Angew. Chem. Int. Ed. 2014, 53: 3844-3848.
D. Chen, "Anti-reflection (AR) coatings made by sol-gel processes: A review", Sol. Energ. Mater. Sol. C. 68 (2001) 313-336.
D. Lee, M.F. Rubner, R.E. Cohen, "All-Nanoparticle Thin-Film Coatings", Nano Lett. 6 (2006) 2305-2312.
D. Lee, Z. Gemici, M.F. Rubner, R.E. Cohen, "Multilayers of Oppositely Charged SiO2 Nanoparticles: Effect of Surface Charge on Multi9layer Assembly", Langmuir 23 (2007) 8833-8837.
D.G. Stavenga; et al. "Light on the moth-eye corneal nipple array of butterflies", Proc. R. Soc. B 273 (2006) 661-667.
Dangla, R.; et al. Microchannel Deformations Due to Solvent-Induced Pdms Swelling. Lab Chip 2010, 10, 2972-2978.
Ding et al., "Morphology and Water Vapor Permeability of Temperature-Sensitive Polyurethanes", Journal of Applied Polymer Science, (2008) vol. 107: 4061-4069.
Ding, T.; et al. Revealing Invisible Photonic Inscriptions: Images from Strain. ACS Appl. Mater. Interfaces 2015, 7, 13497-13502.
Drummond, J. L., D; et al. "Physiological aging of an all-ceramic restorative material." Dental Materials 7.2 (1991): 133-137.
Du et al., "Solvent induced shape recovery of shape memory polymer based on chemically cross-linked poly(vinyl alcohol)", Soft Matter, 2010, 6: 3370-3376.
S. Degand, G. Lamblin, C.C. Dupont-Gillain, "Colloidal lithography using silica particles: Improved particle distribution and tunable wetting properties", J. Colloid Interf. Sci. 392 (2013) 219-225.
S. Lu,; et al. "Receptor-Ligand-Based Specific Cell Adhesion on Solid Surfaces: Hippocampal Neuronal Cells on Bilinker Functionalized Glass" Nano Lett. 6 (2006) 1977-1981.
S. Walheim, E. Schaffer, J. Mlynek, U. Steiner, "Nanophase-Separated Polymer Films as High-Performance Antireflection Coatings", Science 283 (1999) 520-522.
S.P. Pack, N.K. Kamisetty, M. Nonogawa, K.C. Devarayapalli, K. Ohtani, K. Yamada, Y. Yoshida, T. Kodaki, K. Makino, "Direct immobilization of DNA oligomers onto the amine-functionalized glass surface for DNA microarray fabrication through the activation-free reaction of oxanine", Nucleic Acids Res. 35 (2007), 10 pages.

(56) References Cited

OTHER PUBLICATIONS

Sailer, Irena, et al. "A systematic review of the survival and complication rates of all-ceramic and metal-ceramic reconstructions after an observation period of at least 3 years. Part II: fixed dental prostheses." Clinical oral implants research 18 (2007): 86-96.
Salido, María P., et al. "Prospective clinical study of zirconia-based posterior four-unit fixed dental prostheses: four-year follow-up." International Journal of Prosthodontics 25.4 (2012).
Schäfer et al., "Fully Reversible Shape Transition of Soft Spheres in Elastomeric Polymer Opal Films", Langmuir 2013, 29: 11275-11283.
Schäfer et al., "Reversible Light-, Thermo-, and Mechano-Responsive Elastomeric Polymer Opal Films", Chemistry of Materials 2013, 25: 2309-2318.
Schauer, S.; et al. Tunable Diffractive Optical Elements Based on Shape-Memory Polymers Fabricated Via Hot Embossing. ACS Appl. Mater. Interfaces 2016, 8, 9423-9430.
Schneider, Friedrich. "The financial flows of transnational crime and tax fraud in OECD countries: What do we (not) know?." Public Finance Review 41.5 (2013): 677-707.
Scurria, Mark S.; et al. "Meta-analysis of fixed partial denture survival: prostheses and abutments." The Journal of prosthetic dentistry 79.4 (1998): 459-464.
Shang, S. L.; et al Fabrication of Magnetic Field Induced Structural Colored Films with Tunable Colors and Its Application on Security Materials. J. Colloid Interface Sci. 2017, 485, 18-24.
Small IV, et al., "Laser-activated shape memory polymer intravascular thrombectomy device", Optics Express 2005, 13: 8204-8213.
Stober, W.; et al. Controlled Growth of Monodisperse Silica Spheres in Micron Size Range. J. Colloid Interface Sci. 1968, 26, 62-69.
Stojilovic, N., Why Can't We See Hydrogen in X-Ray Photoelectron Spectroscopy? J. Chem. Edu. 2012, 89, 1331-1332.
Stuart et al., "Emerging applications of stimuli-responsive polymer materials", Nature Materials 2010, 9: 101-113.
Sun; et al. "Broadband moth-eye antireflection coatings on silicon" Applied Physics Letters; Feb. 14, 2008, vol. 92, pp. 061112 (1)-(3).
T. Lohmueller, M. Helgert, M. Sundermann, R. Brunner, J.P. Spatz, "Biomimetic Interfaces for High-Performance Optics in the Deep-UV Light Range", Nano Lett. 8 (2008) 1429-1433.
T. Xie, "Recent advances in polymer shape memory", Polymer 2011, 52: 4985-5000.
Takeoka et al., "Polymer Gels that Memorize Structures of Mesoscopically Sized Templates. Dynamic and Optical Nature of Periodic Ordered Mesoporous Chemical Gels", Langmuir 2002, 18: 5977-5980.
Tobushi et al., "Thermomechanical properties in a thin film of shape memory polymer of polyurethane series", Smart Mater. Struct. (1996) 5: 483-491.
Toor, F; et al. "Nanostructured silicon via metal assisted catalyzed etch (MACE): chemistry fundamentals and pattern engineering" Nanotechnology 2016, 27, 412003.
Tsai et al., "Retainment of pore connectivity in membranes prepared with vapor-induced phase separation", Journal of Membrane Science 2010, 362: 360-373.
U. Schulz, "Review of modern techniques to generate antireflective propoerties on thermoplastic polymers", Appl. Opt. 45 (2006) 1608-1618.
Yue et al., "Lamellar Hydrogels with High Toughness and Ternary Tunable Photonic Stop-Band", Advanced Materials 2013, 25: 3106-3110.
Yue et al., "Mechano-actuated ultrafast full-colour switching in layered photonic hydrogels", nature communications 2014: 1-8.
Velev et al., "Porous silica via colloidal crystallization", Nature 1997, 389: 447-448.
Vlasov, Y. A.; et al. On-Chip Natural Assembly of Silicon Photonic Bandgap Crystals. Nature 2001, 414, 289-293.
W.L. Min, B. Jiang, P. Jiang, "Bioinspired Self-Cleaning Antireflection Coatings", Adv. Mater. 20 (2008) 3914-3918.
Wang, M. S.; et al. Magnetically Responsive Nanostructures with Tunable Optical Properties. J. Am. Chem. Soc. 2016, 138, 6315-6323.
Wang, Zhen, et al. "Programmable, pattern-memorizing polymer surface." Advanced Materials 23.32 (2011): 3669-3673.
Weissman et al., "Thermally Switchable Periodicities and Diffraction from Mesoscopically Ordered Materials", Science 1996, 274: 959-960.
Witt, Kendhl Kate. "Optical Sensors for the Analysis of Alcohols in Fuels." (2016).
Woo et al., Preparation and characterization of three dimensionally ordered macroporous Li4Ti5O12 anode for lithium patteries, Electrochimica Acta 2007, 53(1): 79-82.
Yang, D. P.; et al. Polymerization-Induced Colloidal Assembly and Photonic Crystal Multilayer for Coding and Decoding. Adv. Funct. Mater. 2014, 24, 817-825.
Wu, S. L.; et al. Structural Color Patterns on Paper Fabricated by Inkjet Printer and Their Application in Anticounterfeiting. J. Phys. Chem. Lett. 2017, 8, 2835-2841.
K. Li, O. Niitsoo, A. Couzis, "Electrostatically driven adsorption of silica nanoparticles on functionalized surfaces", J. Colloid Interf. Sci. 394 (2013) 26-35.
K. Li, O. Niitsoo, A. Couzis, "Experimental studies on irreversibility of electrostatic adsorption of silica nanoparticles at solid-liquid interface", J. Colloid Interf. Sci. 420 (2014) 50-56.
K.T. Zhang, O. Sato, M. Taguchi, Y. Einaga, T. Murakami, A. Fujishima, "Self-Cleaning Particle Coating with Antireflection Properties", Chem. Mater. 17 (2005) 696-700.
Xie et al., "Encoding Localized Strain History Through Wrinkle Based Structural Colors", Advanced Materials 2010, 22: 4390-4394.
Xu et al., "Deformable, Programmable, and Shape-Memorizing Micro-Optics", Advanced Functional Materials 2013, 23: 3299-3306.
Xue et al., "Synthesis and characterization of elastic star shape-memory polymers as self-expandable drug-eluting stents", Journal of Materials Chemistry 2012, 22: 7403-7411.
Y. Masuda, M. Itoh, T. Yonezawa, K. Koumoto, "Low-Dimensional Arrangement of SiO2 Particles", Langmuir 18 (2002) 4155-4159.
Y. Zhao, J.S. Wang, G.Z. Mao, "Colloidal subwavelength nanostructures for antireflection optical coatings", Opt. Lett. 30 (2005) 1885-1887.
Yakacki et al., "Shape-Memory Polymers for Biomedical Applications", Adv. Polym. Sci. 2010, 226: 147-175.
Yakacki et al., "Unconstrained recovery characterization of shape-memory polymer networks for cardiovascular applications", ScienceDirect, Biomaterials 2007, 28: 2255-2263.
Yakacki, Christopher M., et al. "Impact of shape-memory programming on mechanically-driven recovery in polymers." Polymer 52.21 (2011): 4947-4954.
Yang et al., "From Metastable Colloidal Crystalline Arrays to Fast Responsive Mechanochromic Photonic Gels: An Organic Gel for Deformation-Based Display Panels", Adv. Funct. Mater. 2014, 24: 3197-3205.
Yang et al., "Macroporous photonic crystal-based vapor detectors created by doctor blade coating", Appl. Phys. Lett. 2011, 98: 1-3.
A. Lendlein, "Shape-Memory Polymers", Advances in Polymer Science 226, Springer, New York, NY 2010, 1-209.
H.A. Macleod, Thin-Film Optical Filters. Third ed., Institute of Physics Publishing, Bristol, 2001, 666 pages.
Gregg, S. J.; et al. Adsorption, Surface Area and Porosity. 2nd ed.; Academic Press Inc.: London, 1982.
J. D. Joannopoulos, R. D. Meade, J. N. Winn, Photonic Crystals: Molding the Flow of Light, Princeton University Press, 135 pages.
A. Luque, S. Hegedus, Handbook of Photovoltaic Science and Engineering. John Wiley & Sons, West Sussex, 2003, 115 pages.

* cited by examiner

METHODS OF FORMING AN ANTIREFLECTIVE LAYER ON A COMPLEX SUBSTRATE AND COMPLEX SUBSTRATES HAVING THE ANTIREFLECTIVE LAYER

This application is the 35 U.S.C. § 371 national stage of PCT application having serial number PCT/US2018/066349, filed on Dec. 19, 2018. This application also claims priority to U.S. provisional application entitled "METHODS OF FORMING AN ANTIREFLECTIVE LAYER ON A COMPLEX SUBSTRATE AND COMPLEX SUBSTRATES HAVING THE ANTIREFLECTIVE LAYER," having Ser. No. 62/607,987 filed on Dec. 20, 2017, which are entirely incorporated herein by reference.

FEDERAL SPONSORSHIP

This invention was made with government support under HDTRA1-15-1-022 awarded by the Department of Defense/Defense Threat Reduction Agency; and under CMMI1562861 awarded by the National Science Foundation. The government has certain rights in the invention.

BACKGROUND

Antireflection (AR) coatings that can significantly reduce optical reflection through various optical surfaces are of great technological importance in a wide spectrum of applications ranging from improving light conversion efficiency of solar cells and increasing transmittance of optical lenses to eliminating ghost images for flat-panel displays and reducing glare from automobile dashboards. Traditional quarter-wavelength AR coating employs destructive interference of reflected light from the coating surface and the coating/substrate interface to eliminate unwanted optical reflection and enhance light transmission. Two criteria need to be met to optimize the AR performance of quarter-wavelength coatings: (1) the coating thickness is about one-quarter of the operating wavelength, and (2) the refractive index of the coating is close to the geometric mean of the indices of the substrate and the surrounding media (typically air).

SUMMARY

Embodiments of the present disclosure provide antireflective layers, structures including antireflective layers, and the like.

An embodiment of the present disclosure includes methods for forming an antireflective layer on a substrate. The method includes disposing a substrate in a solution. The substrate can have a complex three-dimensional shape, wherein one or more surfaces of the substrate are functionalized to have a net positive charge. The solution can include a colloidal suspension of negatively charged silica nanoparticles. The method also includes forming, simultaneously, a uniform monolayer of silica nanoparticles on one or more surfaces of the substrate through electrostatic attraction of the silica nanoparticles and the functionalized surfaces of the substrate to form the antireflective layer on the substrate, removing the substrate from the solution, and treating the antireflective layer with a vapor to form a durable antireflective layer on the substrate. The vapor can include a silicate compound.

An embodiment of the present disclosure also includes structures made from the methods described herein.

An embodiment of the present disclosure also includes structures having a durable antireflective layer on the surface of a substrate. The substrate can have a complex three-dimensional shape. The durable antireflective layer can include a uniform monolayer of silica nanoparticles interconnected by $SiO_2$, a uniform monolayer of silica nanoparticles bonded to the surface of the substrate, or a combination thereof.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 2A is scheme showing 6 different regions labeled on the exterior and interior surfaces of a volumetric flask. FIGS. 2B-2G are typical SEM images of the regions 1-6 for the coated flask in FIG. 1. FIG. 2H shows average nanoparticle surface coverage ratios for the regions 1-6 on the coated flask.

Figure 1:
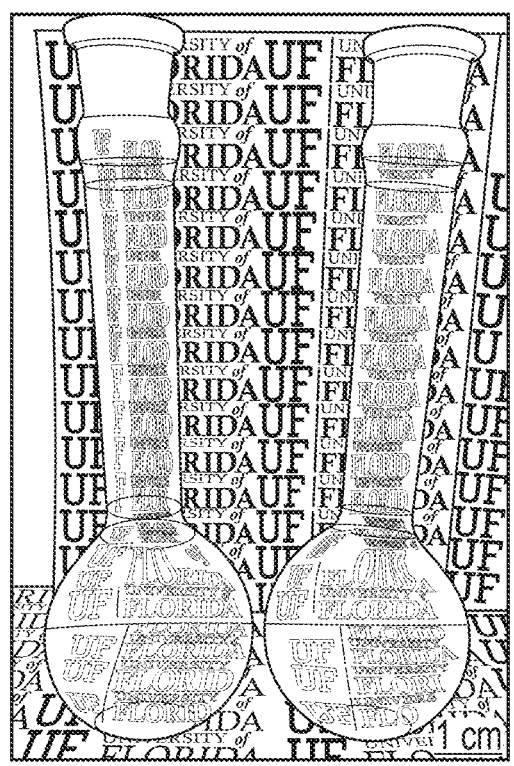
FIG. 1 is a photograph comparing a glass volumetric flask covered with an example of monolayer silica nanoparticle AR coatings of the present disclosure on both interior and exterior surfaces (left) and a bare flask (right) under white light illumination.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of chemistry, material science, and the like, which are within the skill of the art. Such techniques are explained fully in the literature.

The following examples are put forth so as to provide those of ordinary skill in the art with a complete disclosure and description of how to perform the methods and use the structures disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DISCUSSION

Embodiments of the present disclosure provide for methods of making substrates having an antireflective layer (e.g., durable antireflective layer), substrates having an antireflective layer, devices including a substrate having an antireflective layer, and the like. Embodiments of the present disclosure provide for substrates that have high quality antireflection coatings that are uniform and have excellent antireflection properties and are very durable. In particular, substrates of the present disclosure have light reflection properties and light transmission properties that are superior to currently used antireflective substrates. Embodiments of the present disclosure are advantageous in that the method is simple, inexpensive, and scalable, while providing very durable antireflective layer unlike other competing technologies.

Embodiments of the substrate can have complex two- or three-dimensional geometries. Unlike current technologies, embodiments of the present disclosure can include substrates that have one or more concave, convex, polygonal, or the like inner and outer surfaces. In an aspect, the substrate can have a plurality of concave and convex surfaces. Non-limiting examples of such substrates include complex glassware such as that used in the chemical and biological industries, where the glassware has complex concave and convex surfaces on the inner and outer areas of the glassware. Current techniques are not able to reach the numerous curved surfaces of complex glassware, whereas the wet chemical approach provided herein can reach all inner and outer surfaces of these types of geometrically complex substrates. In an example, the glassware can include: Buchner flask, burette, cold finger, condenser, cuvette, Erlenmeyer flask, Erlenmeyer bulb, Florence flask, Freidrichs condenser, funnel, pipette, retort, round bottom flask, Schlenk flask, separatory funnel, Soxhlet extractor, Thiele tube, volumetric flask, various distillation glassware, vials, graduate cylinder, test tubes, bottles and jars, spot plates, evaporation dishes, boiling flask, suction flask, crystallization dish, long condenser, vacuum adapter, distillation adapter, dropper and the like concave/convex glassware.

Embodiments of the present disclosure provide for an electrostatic-assisted colloidal self-assembly technology for fabricating monolayer nanoparticle antireflective layer (e.g., coating) over large geometrically complex areas of a substrate. This approach can be based on the electrostatic adsorption of negatively charged silica nanoparticles on surface-functionalized glass substrates with positive surface charges. This technology could enable simultaneous coating of both sides (e.g., inner and outer surfaces) of geometrically complex glass substrates. Embodiments of the method are inherently parallel for potential large-scale fabrication of inexpensive antireflective layer with high coating quality and reproducibility.

Embodiments of the present disclosure provide for a simple, inherently parallel, and scalable bottom-up approach for fabricating nanoparticle antireflective layer on geometrically complex substrates. Negatively charged silica nanoparticles can be electrostatically adsorbed onto a surface-functionalized substrate (e.g., glass substrate) with positive surface charges to form a disordered monolayer nanoparticle coating. Specular reflection and transmission measurements demonstrate that good antireflective performance (e.g. about 2 to 3% with two-sided reflection) and high optical transmission (e.g., about 97 to 99%) can be achieved by the self-assembled nanoparticle coatings of the present disclosure. It should be noted that although silica nanoparticles are described above and in some aspects or embodiments, the nanoparticles can include other materials or combinations of materials as provided herein.

In an exemplary embodiment, the method of forming an antireflective layer on a substrate includes forming (e.g., self-assembled), simultaneously, a colloidal monolayer of particles (e.g., silica) on the inner and outer surfaces of a geometrically complex substrate. In an embodiment, the nanoparticles can be attached to the surface of the substrate via electrostatic attraction. In particular, a substrate is disposed in a solution that is exposed to constant mixing (e.g., shaking) during exposure of the substrate to the solution. In an embodiment, shaking the solution continuously during exposure can prevent sedimentation and also ensures constant movement of the nanoparticles in the solution so that they can absorb on the empty surfaces of the substrate. In an embodiment, the shaking can be produced using sonication, mechanical shaking, magnetic stirring, hand shaking, or a combination thereof.

In an embodiment, the substrate can be exposed to the solution for about 10 sec to 120 min, about 30 min to 120 min, about 60 min to 120 min, or about 90 min. In an embodiment, the solution can be exposed to shaking for about 10 sec to 120 min, about 30 min to 120 min, about 60 min to 120 min, or about 90 min.

After exposure to the solution, the coated substrate can be rinsed to remove any unbound nanoparticles to the inner surface and the outer surface. For example, the coated substrate can be exposed to a solvent (e.g., ethanol or another alcohol) and then allowed to air dry.

In an aspect, the substrate including the antireflective layer can be further treated to form a durable antireflective layer. In an embodiment, the durable antireflective layer comprises the uniform monolayer of silica nanoparticles bonded to one another by $SiO_2$, the uniform monolayer of silica nanoparticles bonded to the substrate surface via $SiO_2$, or a combination thereof. In an embodiment, the $SiO_2$ and the silica nanoparticles form a $SiO_2$-particle network where the silica particles can be attached to one or more other silica particles by $SiO_2$ and/or the silica particles can be attached to the surface of the substrate by $SiO_2$. In an aspect, the $SiO_2$-particle network of the durable antireflective layer does not reduce a transmittance % of the antireflective layer by more than about 4%, about 2%, or about 1%. In an aspect, the $SiO_2$-particle network does not form a layer of $SiO_2$ over the surface of the uniform monolayer of silica nanoparticles since forming such a $SiO_2$ layer would reduce transmittance. In an aspect, the $SiO_2$-particle network does not form a layer of $SiO_2$ over the surface of the uniform monolayer of silica nanoparticles that would reduce transmittance by more than about 4%, about 2%, or about 1%.

In an aspect, the $SiO_2$-particle network can be formed by treating, with a vapor, the antireflective layer on the substrate, where the vapor includes components to form $SiO_2$. In an embodiment, the components to form the $SiO_2$ can include a water and a silicate compound in the vapor phase that react on the surface of the antireflective layer. In an aspect, the silicate compound can be selected from: an alkyl group (C2 to C6 alkyl) silane, tetraethoxysilane (TEOS), tetramethyl orthosilicate, 3-isocyanatopropyltriethoxysilane, (3-glycidoxypropyl)methyldiethoxysilane, 3-aminopropyltris(methoxyethoxyethoxy)silane, (3-glycidoxypropyl)bis(trimethylsiloxy)methylsilane, tris(clycidoxypropyldimethylsiloxy)phenylsilane, and a combination thereof. For example, the concentration of the water and silicate compound in the vapor phase can be about 1:1 ratio. In an embodiment, the higher concentration of silicate compound to water will result in shorter treatment time.

In an embodiment, the substrate including the antireflective layer can be positioned in a chamber along with the components to form the $SiO_2$. For example, the components can separately include water and the silicate compound (e.g., tetraethoxysilane (TEOS)). The substrate and the components can be heated to about a temperature of about 60 to 100° C. for a time frame of about 1 to 3 hours. In an embodiment, the temperature can be about 80° C. and the time frame is about 2.5 hours.

In an embodiment, the light reflected is about 0.5 to 4% over a wavelength of about 400 nm to 800 nm for the substrate having the antireflective layer or the durable antireflective layer. In an embodiment, the light reflected is about 14% for a wavelength of about 550 nm for the substrate having the antireflective layer or the durable antireflective layer. In an embodiment, the light transmission is about 99% or more over a wavelength of about 500 to 650 nm for the substrate having the antireflective layer or the durable antireflective layer. In an embodiment, the substrate has both the light reflected property and the light transmission property.

In an exemplary embodiment, the substrate can include a silicon substrate, a gallium arsenide (GaAs) substrate, a gallium antimonide (GaSb) substrate, indium phosphide (InP), gallium nitride (GaN), sapphire, and the like. In an embodiment, the silicon substrate can include a single crystal silicon substrate, a multi-crystalline substrate, or an amorphous silicon substrate. In an embodiment, the substrate can have a thickness of about 2 μm to 10 cm or more and the length and width can vary depending upon the desired use or application.

In an embodiment, the substrate can have an inner surface and an outer surface that is functionalized to have a net negative charge. In an embodiment, the surface can be functionalized by attaching a functional group that imparts a net positive charge to the surface of the substrate. In an embodiment, the functional group can include an amino group, sulfate group, phosphate group, or a combination thereof. The Examples provide additional details.

In an embodiment, the solution can include nanoparticles. In an embodiment, the nanoparticle can be a silica nanoparticle, polystyrene nanoparticle, titania nanoparticle, alumina nanoparticle, gold nanoparticles, silver nanoparticles, or iron oxide nanoparticles or mixtures thereof. In an embodiment, the nanoparticle can be a silica nanoparticle. In an embodiment, the nanoparticle can have a geometric shape of a sphere or is generally spherical but not 100% spherical. In an embodiment, the nanoparticle can have a diameter of about 50 to 500 nm, about 50 to 300 nm, about 50 to 250 nm, or about 100 to 200 nm. In an embodiment, the mass fraction of nanoparticles present in the solution can be about 1 to 5% or about 1 to 2%, or about 1.6%.

In an embodiment, the solution includes a solvent and water. In an embodiment, the solvent can include methanol, ethanol, isopropanol, acetone, or a combination thereof. In an embodiment, the solvent can be ethanol. In an embodiment, the ratio of solvent to water can be about 80 to 95% by volume of solvent and about 5 to 20% by volume of water, about 85 to 95% by volume solvent and about 5 to 15% by volume of water, or about 90% by volume solvent and about 10% by volume of water. In an embodiment, the silica nanoparticles in the ethanol-water solution can be about 1% to 4% by volume. In a particular embodiment, the ratio of ethanol to water can be about 90% by volume ethanol and about 10% by volume of water and the silica nanoparticles can be about 2.1% by volume in the ethanol-water solution.

In an embodiment, the antireflective layer or the durable antireflective layer has a total specular reflection of about 2% or less, about 1%, or less, or about 0.5% or less, for the entire visible wavelength at an incident angle of about 0° to 90°. The phrase "total specular reflection" means the overall specular reflection obtained from a substrate surface with reflection angle between 0 and 90°. An integration sphere can be used in measuring total specular reflection.

While embodiments of the present disclosure are described in connection with the Example and the corresponding text and figures, there is no intent to limit the disclosure to the embodiments in these descriptions. On the contrary, the intent is to cover all alternatives, modifications, and equivalents included within the spirit and scope of embodiments of the present disclosure.

Example 1

Vacuum deposition of dielectric films with tightly controlled thicknesses and low refractive indices (e.g., magnesium fluoride with a refractive index of 1.383 at 632.8 nm) is broadly utilized in fabricating quarter-wavelength AR coatings on glass substrates [7,8]. However, traditional vacuum deposition technologies, such as sputtering and plasma-enhanced chemical vapor deposition (PECVD), suffer from high equipment and operating cost, limited selection of coating materials, and low throughput [8]. In addition, it is formidably challenging in coating nonplanar optical surfaces with complex geometries, especially those with enclosed concave surfaces, using the state-of-the-art vacuum deposition approaches [9,10]. For instance, a sophisticated and specially designed magnetron sputtering source with a tuned cylindrical shape has been developed in depositing high-quality quarter-wavelength AR coatings on deep concave optical surfaces [9]. However, this unique equipment design is only optimized for specific geometries. The deposition system and processes need to be redesigned for coating other geometrically complex optical surfaces.

Complementing the complex yet precise vacuum deposition technologies, various solution-based processes have been exploited for fabricating uniform quarter-wavelength AR coatings on a plethora of optical substrates (e.g., glass, plastics, and semiconductors) [11-19]. These wet approaches are generally simpler, faster, less expensive, and more easily applicable to large areas than vacuum-based methodologies [14]. For example, spin coating is a common technique for depositing porous nanoparticle coatings or phase-separated polymer blends with well-controlled thicknesses over planar surfaces [1,3,17]. Layer-by-layer (LBL) deposition of polyelectrolyte and/or nanoparticle multilayers is another popular approach for assembling AR coatings with adjustable thicknesses on both planar and non-planar surfaces [14,20,21]. However, LBL deposition involves multiple electrostatic adsorption and washing steps, which greatly impede the ultimate throughput of the self-assembled AR coatings. This limitation becomes even worse for optical surfaces with complex geometries (e.g., enclosed spaces) as automated LBL deposition processes cannot be easily adapted to improve the yields of the final multilayer coatings [22]. Reported herein is a much simpler and faster electrostatics-assisted self-assembly approach for depositing monolayer nanoparticle AR coatings on geometrically complex surfaces. Importantly, optical measurements and theoretical simulations based on a simplified thin-film multilayer model indicate that optimal nanoparticle surface coverage ratios can be readily achieved by this single-step, solution-based process.

The versatile bottom-up technology described herein is based on electrostatics-assisted adsorption of negatively charged silica nanoparticles on surface-modified optical surfaces possessing positive surface charges. This approach has been extensively employed in assembling monolayer nanoparticle AR coatings on planar substrates [13,15,23-25]. However, the great potential of this simple methodology in fabricating high-quality AR coatings on geometrically complex surfaces has not yet been exploited. The simultaneous deposition of uniform nanoparticle AR coatings is demonstrated on both the interior and exterior surfaces of a 50-mL glass volumetric flask with a long and narrow neck as a proof-of-concept prototype. As shown by the photograph in FIG. 1, the very complex geometry of the flask makes it nearly impossible to deposit dielectric AR coatings on its curved and enclosed surfaces using conventional vacuum-based technologies [9]. To enable electrostatics-assisted adsorption of monolayer nanoparticle AR coatings, the glass volumetric flask is first cleaned using a piranha solution ($H_2SO_4$:$H_2O_2$=4:1 by volume) at 70° C. for 30 min. The surface of the glass flask is then modified with 3-aminopropyltriethoxysilane (APS) by immersing in a 2.5 vol. % APS/toluene solution for 2 h through the well-established silane coupling reactions [26]. The amino groups of the covalently bonded APS molecules reverse the glass surface changes from negative to positive. The surface-functionalized volumetric flask is then dipped in a colloidal suspension comprising 4.2 wt. % silica nanoparticles (110 nm diameter and less than 10% diameter standard deviation) dispersed in an ethanol-water mixture with 90 vol. % ethanol for 60 min. The negatively charged silica nanoparticles, which are synthesized by the standard Stöber method and possess a typical zeta potential of ~-45 mV (measured using a Brookhaven ZetaPlus Analyzer), can be electrostatically adsorbed on the oppositely charged surfaces of the flask. The self-limiting effects caused by the strong electrostatic repulsion between the deposited nanoparticles and the particles in the colloidal suspension lead to the formation of monolayer nanoparticle coatings on the complex flask surfaces. The coated volumetric flask is then rinsed with pure ethanol to remove loosely attached silica nanoparticles and is finally air-dried.

Figure 2A:
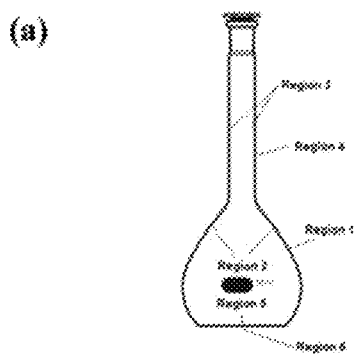
FIGS. 2A-2G provide examples of AR coatings of the present disclosure.
Figure 2B:
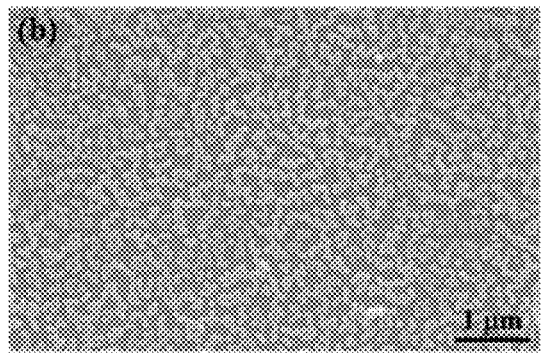
Figure 2C:
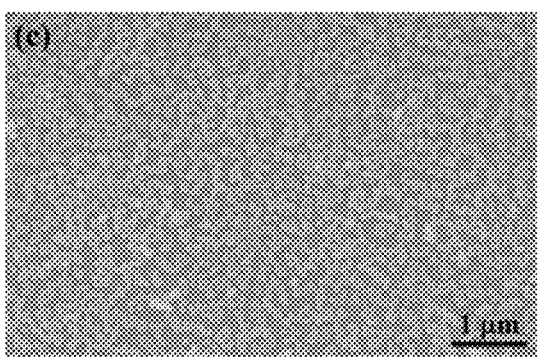
Figure 2D:
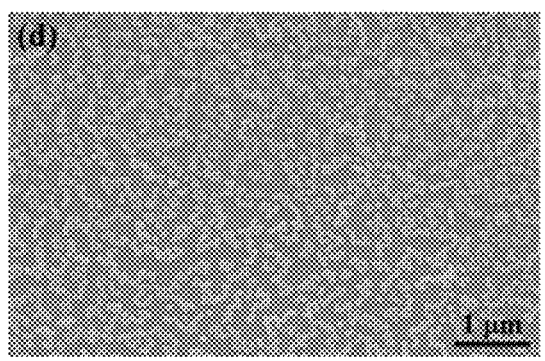
Figure 2E:
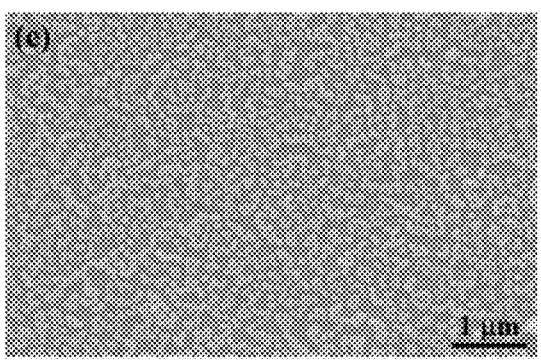
Figure 2F:
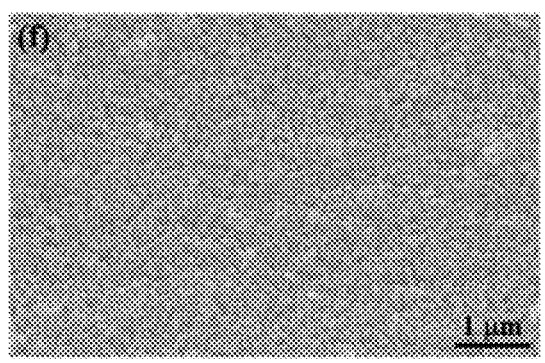
Figure 2G:
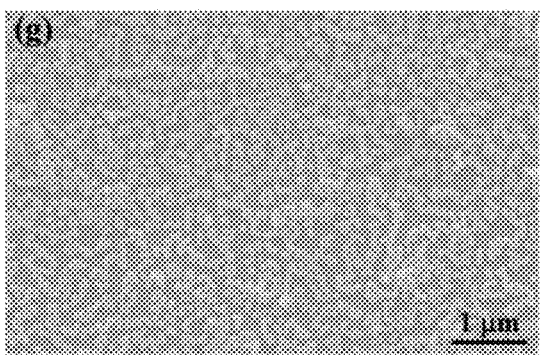
Figure 2G:
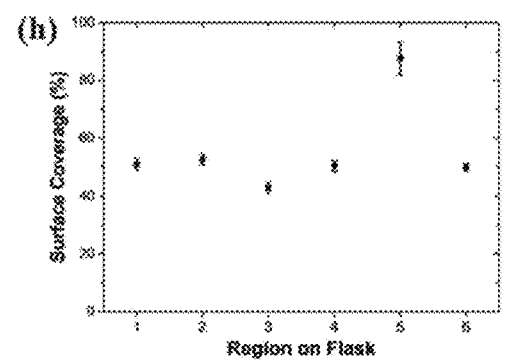

FIG. 1 shows a photograph that compares a coated volumetric flask with the electrostatically adsorbed monolayer nanoparticle AR coatings (left) with a bare flask (right) under white light illumination. The coated flask exhibits characteristic purplish/bluish hue and significantly reduced light reflection than the uncoated flask. Importantly, the attached silica nanoparticles evenly cover the whole body of the flask (both interior and exterior), indicating high uniformity of the self-assembled nanoparticle AR coatings. The reproducibility of this simple colloidal self-assembly technology was further evaluated by consecutively coating 3 volumetric flasks using the same colloidal suspension. The final AR coatings are nearly identical in their visual appearance and antireflection performance. In addition to enable monolayer nanoparticle deposition, the strong electrostatic attraction between the oppositely charged glass surfaces and the silica nanoparticles can also stabilize the adsorbed nanoparticle coatings. Further improvement in the mechanical strength/durability of the self-assembled AR coatings can be achieved by thermally annealing the coated flasks at 450° C. for 1 h. Scanning electron microscope (SEM) is used in characterizing the microstructures of the electrostatically adsorbed nanoparticle AR coatings on various regions of the coated volumetric flask. As shown by the schematic illustration in FIG. 2A, 6 different regions on the exterior and interior surfaces of the flask are arbitrarily assigned and labeled. The typical top-view SEM images in FIGS. 2B and 2C illustrate the spatial distribution of the adsorbed silica nanoparticles on the interior (Region 1) and exterior (Region 2) surfaces of the pear-shaped bulb part of the coated volumetric flask shown in FIG. 1. It is apparent that the assembled silica nanoparticles are randomly arranged and they form monolayer colloidal clusters. The average nanoparticle surface coverage ratios of these regions are determined to be 51.0±2.0% and 52.8±1.9% by analyzing multiple SEM images using an ImageJ program. FIGS. 2D and 2E show the nanoparticle distribution on the interior (Region 3) and exterior (Region 4) surfaces of the long neck of the flask. The nanoparticle surface coverage ratio of the Region 3 (42.9±1.9%) is slightly lower than that of the Region 4 (50.4±1.8%). The gravitational sedimentation of silica nanoparticles (with a density of 2.0 g/cm$^3$) in the narrow neck region could lead to this relatively lower surface coverage ratio. Another apparent effect of the gravitational sedimentation is the formation of a dense, multilayer nanoparticle coating with a very large surface coverage ratio (87.6±5.8%) on the inner surface of the flat bottom of the flask (Region 5) as shown by the SEM image in FIG. 2F. By contrast, FIG. 2G reveals that patchy colloidal monolayers with an average surface coverage ratio of 49.9±1.2% cover the exterior flat bottom of the flask (Region 6). FIG. 2H compares the average nanoparticle surface coverage ratios for all 6 regions on the coated volumetric flask. Except for the interior bottom surface, where the randomly deposited nanoparticles make a multilayer coating with a very large coverage ratio, the electrostatically assembled nanoparticles on all other regions exhibit average surface coverage ratios close to 50%.

Figure 3:
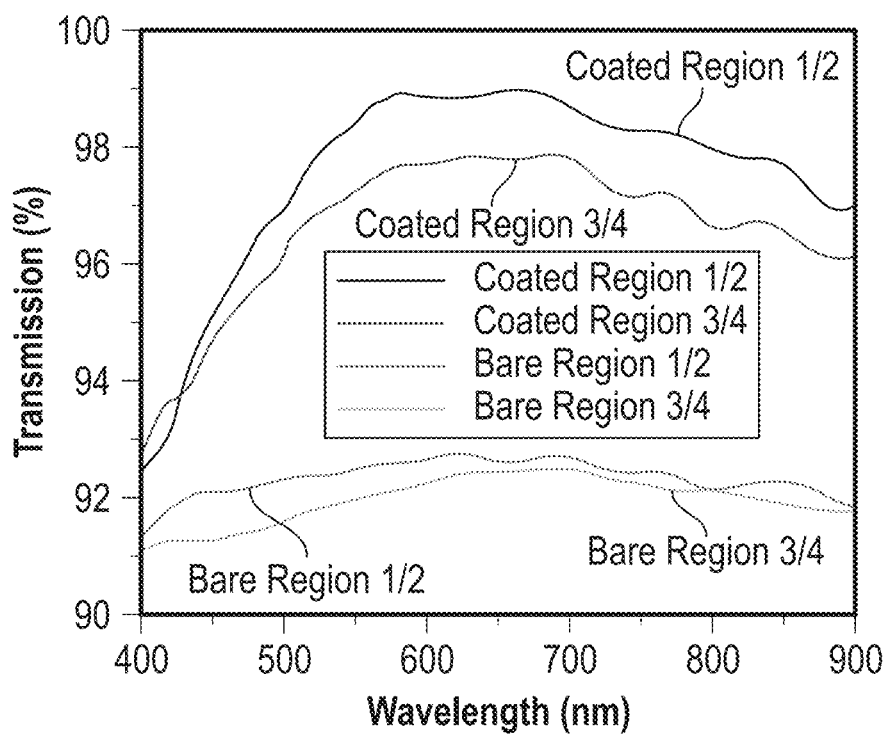
FIG. 3 shows normal-incidence optical transmission spectra obtained from the pear-shaped bulb part (Region 1/2) and the narrow neck (Region 3/4) of the coated and the bare flasks of FIG. 1.

The antireflection performance of the self-assembled nanoparticle AR coatings on different regions of the flask is evaluated through optical transmission measurements using an Ocean Optics HR400 high-resolution vis-NIR spectrometer with a calibrated halogen light source. The nanoparticle-coated and the bare volumetric flasks are carefully broken into small pieces prior to optical tests. Transmission measurements for different regions of the flasks are then performed at normal incidence and the beam spot size is ~0.8 mm on the sample surface. Combined with the small cone angle of collection (<5°) enabled by the optical fiber probe of the spectrometer, this miniature spot size can effectively reduce the unwanted optical distortion caused by the non-planar surfaces of the flasks with different curvatures. FIG. 3 compares the optical transmission spectra obtained from the bulb and the neck parts of the nanoparticle-coated and the bare volumetric flasks shown in FIG. 1. The untreated glass regions exhibit a lower transmittance of ~91-92% for wavelengths between 400 and 900 nm, indicating a single-sided reflectance of ~4.0-4.5% from a bare glass/air interface. This value favorably agrees with the predication using the Fresnel equation [7]:

$$R = \left(\frac{n_1 - n_2}{n_1 + n_2}\right)^2 \quad (1)$$

where R is the optical reflectance at normal incidence, $n_1$ and $n_2$ are refractive indices of glass (~1.5 for common glass) and air (1.0). The good AR performance of the electrostatically assembled silica nanoparticle coatings is confirmed by the significantly improved light transmission through the coated regions. The bulb part shows >97% transmittance for wavelengths from 500 to 900 nm; while the neck region exhibits a slightly lower transmittance of >96% for the same wavelength range. Importantly, for a narrow band of wavelengths (e.g., ~550-~700 nm), high transmittance (near 99% for the bulb part and 98% for the neck region) can be achieved. The lower transmittance through the coated neck region than the coated bulb part is possibly affected by the larger curvature of the corresponding glass surface. In addition, the lower nanoparticle surface coverage ratios exhibited by the neck regions, especially on the inner glass surface (see FIGS. 2D and 2H), can also affect the final AR performance.

To gain fundamental insights into the effects of the nanoparticle surface coverage ratio on the optical performance of self-assembled nanoparticle AR coatings, as well as pursue rational design and fabrication of optimal coatings, numerical simulations were performed using a simplified thin-film multilayer model [27]. In this method, the silica nanoparticle monolayers are first divided into 100 horizontal circular layers. The radius of each layer ($r^*$) can be correlated with the z-coordinate ($z^*$) as:

$$r^* = \sqrt{r^2 - (z^* - r)^2} \quad (2)$$

where r is the radius of silica nanoparticles and $0 \leq z^* \leq 2r$. The fraction of silica (with $n_{silica}=1.5$) in the horizontal layer at height $z^*$ can be calculated as:

$$f(z^*) = \frac{(r^*)^2}{r^2} f_{sa} \quad (3)$$

where $f_{sa}$ is the nanoparticle coverage ratio. The effective refractive index of the layer at level $z^*$ can be approximated as:

$$n(z^*) = [f(z^*)n_{silica}^q + (1 - f(z^*))n_{air}^q]^{\frac{1}{q}} \quad (4)$$

where $q=\frac{2}{3}$ based on the effective medium theory [27]. Once $n(z^*)$ is determined, the normal-incidence reflection of the system is calculated by solving the Maxwell equation to get the electromagnetic fields in each layer [27]. The electromagnetic boundary conditions between neighboring layers are finally applied in sequence to generate the reflected field amplitudes.

Figure 4A:
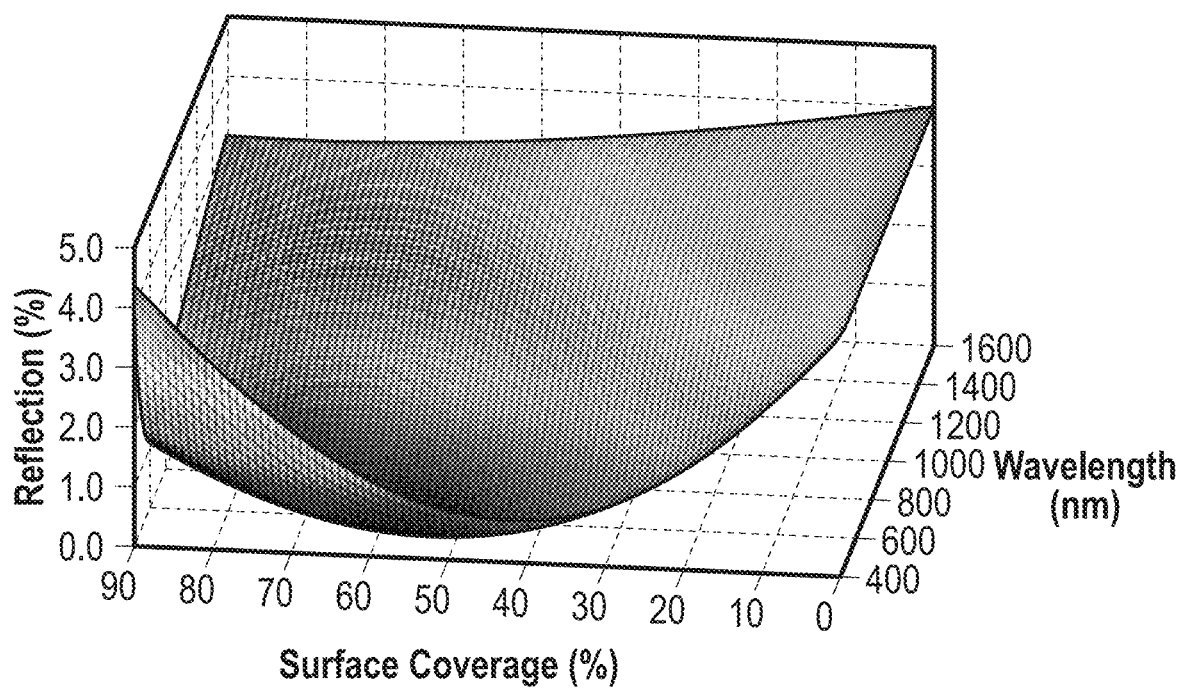
FIGS. 4A-4B show simulated, color-coded, and stacked optical reflection spectra of an example nanoparticle AR coating consisting of 110 nm particles with different surface coverage ratios presented in (FIG. 4A) 3D and (FIG. 4B) 2D.
Figure 4B:
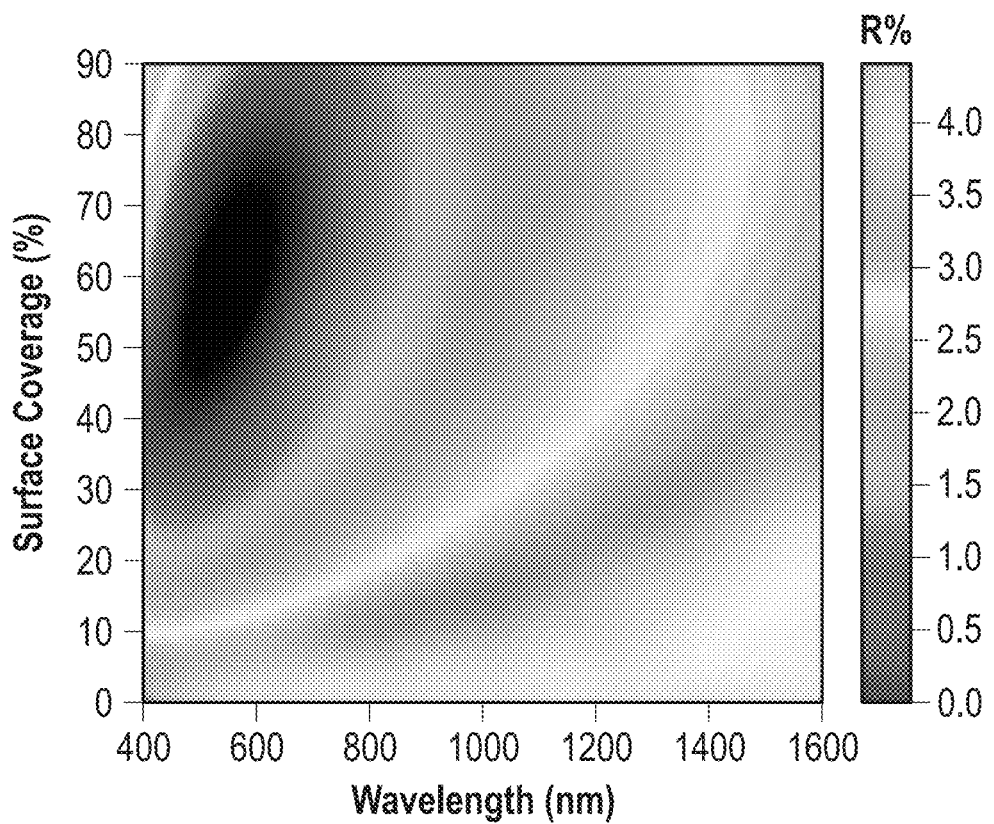

The optical modeling results for a randomly arranged nanoparticle AR coating comprising 110 nm silica particles with different surface coverage ratios are shown by the color-coded and stacked optical reflection spectra in both 3D (FIG. 4A) and 2D (FIG. 4B). It is apparent that the nanoparticle surface coverage ratio plays a critical role in determining the antireflection performance of the self-assembled nanoparticle AR coatings. The minimal optical reflection occurs when nanoparticles cover only ~50-60% of a glass surface, which favorably coincides with the typical nanoparticle surface coverage ratios achieved by the current electrostatics-assisted colloidal self-assembly technology (see FIG. 2H). In addition, the wavelength range showing the highest light transmittance (see FIG. 3) match reasonably well with optical simulation results (i.e., the regions with the darkest colors in FIG. 4B). Moreover, the numerical modeling indicates that the minimal reflection wavelength slightly red-shifts with increasing nanoparticle surface coverage ratio. This can be explained by using the traditional quarter-wavelength condition [18]:

$$\lambda_0 = 4 n_c h_c \quad (5)$$

where $\lambda_0$ is the minimal reflection wavelength, $n_c$ and $h_c$ are the effective refractive index of the nanoparticle coating and the coating thickness (equals the nanoparticle diameter), respectively. An increase in the nanoparticle surface coverage ratio leads to a higher $n_c$ and thus the red shift of the minimal reflection wavelength.

In conclusion, a simple yet versatile bottom-up technology is described based on electrostatics-assisted colloidal self-assembly for fabricating nanoparticle AR coatings on geometrically complex optical surfaces, which are formidably challenging or even completely impossible to be coated by conventional top-down and bottom-up approaches. The electrostatically adsorbed monolayer silica nanoparticles cover ~50% of the substrate surface, which is predicted to be within the optimal surface coverage range for achieving minimal light reflection by the optical modeling.

REFERENCES

1. S. Walheim, E. Schäffer, and U. Steiner, Science 283, 520 (1999).
2. J. A. Hiller, J. D. Mendelsohn, and M. F. Rubner, Nat. Mater. 1, 59 (2002).
3. M. Ibn-Elhaj and M. Schadt, Nature 410, 796 (2001).
4. C. L. Fang, J. Zheng, Y. J. Zhang, Y. J. Li, S. Y. Liu, W. J. Wang, T. Jiang, X. S. Zhao, and Z. H. Li, ACS Appl. Mater. Interfaces 10, 21950 (2018).
5. Y. Li, D. B. Fullager, E. Angelbello, D. Childers, G. Boreman, and T. Hofmann, Opt. Lett. 43, 239 (2018).
6. L. Yao, Z. Qu, Z. L. Pang, J. Li, S. Y. Tang, J. H. He, and L. L. Feng, Small 14, 1801661 (2018).
7. H. A. Macleod, *Thin-Film Optical Filters*, Third ed. (Institute of Physics Publishing, Bristol, 2001).
8. G. P. Du, Y. Zhang, W. Li, N. Chen, B. F. Liu, and J. Sun, Prog. Photovol. 23, 1806 (2015).
9. T. D. Rhmlow, J. E. Lazo-Wasem, M. B. Moran, and L. F. Johnson, Proc. SPIE 7660, 766026 (2010).
10. K. Pfeiffer, U. Schulz, A. Tunnermann, and A. Szeghalmi, Coatings 7, 118 (2017).
11. C. Y. Lin, K. Y. A. Lin, T. W. Yang, Y. C. Chen, and H. T. Yang, J. Colloid Interface Sci. 490, 174 (2017).
12. P. Buskens, M. Burghoorn, M. C. D. Mourad, and Z. Vroon, Langmuir 32, 6781 (2016).
13. X. Li, O. Niitsoo, and A. Couzis, J. Colloid Interface Sci. 394, 26 (2013).
14. H. Shimomura, Z. Gemici, R. E. Cohen, and M. F. Rubner, ACS Appl. Mater. Interfaces 2, 813 (2010).
15. B. T. Liu and W. D. Yeh, Thin Solid Films 518, 6015 (2010).
16. B. G. Prevo, E. W. Hon, and O. D. Velev, J. Mater. Chem. 17, 791 (2007).
17. Y. Zhao, J. S. Wang, and G. Z. Mao, Opt. Lett. 30, 1885 (2005).
18. K. Askar, B. M. Phillips, X. Dou, J. Lopez, C. Smith, B. Jiang, and P. Jiang, Opt. Lett. 37, 4380 (2012).
19. K. Askar, B. M. Phillips, Y. Fang, B. Choi, N. Gozubenli, P. Jiang, and B. Jiang, Colloid Surf. A 439, 84 (2013).
20. W. S. Tan, Y. Du, L. E. Luna, Y. Khitass, R. E. Cohen, and M. F. Rubner, Langmuir 28, 13496 (2012).
21. Y. Du, L. E. Luna, W. S. Tan, M. F. Rubner, and R. E. Cohen, ACS Nano 4, 4308 (2010).
22. G. M. Nogueira, D. Banerjee, R. E. Cohen, and M. F. Rubner, Langmuir 27, 7860 (2011).
23. X. T. Zhang, O. Sato, M. Taguchi, Y. Einaga, T. Murakami, and A. Fujishima, Chem. Mater. 17, 696 (2005).
24. B. T. Liu and W. D. Yeh, Colloids Surf. A 356, 145 (2010).
25. K. Askar, J. M. Wang, S. Y. Leo, C. Kim, A. M. Fenton, P. Jiang, and B. Jiang, Thin Solid Films 621, 156 (2017).
26. E. Metwalli, D. Haines, O. Becker, S. Conzone, and C. G. Pantano, J. Colloid Interface Sci. 298, 825 (2006).
27. D. G. Stavenga, S. Foletti, G. Palasantzas, and K. Arikawa, Proc. R. Soc. B 273, 661 (2006).

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

The invention claimed is:

1. A structure comprising:
   a durable antireflective layer disposed directly onto an inner surface and an outer surface of a substrate, wherein:
   the substrate has a three-dimensional shape comprising one or more of a concave inner surface, a convex inner surface, and a polygonal inner surface and one or more of a concave outer surface, a convex outer surface, and a polygonal outer surface,
   the inner surface of the substrate is functionalized to have a positive charge and the durable antireflective layer has a negative charge,
   the durable antireflective layer is electrostatically adsorbed directly onto the inner surface,
   the outer surface of the substrate is functionalized to have a positive charge and the durable antireflective layer has a negative charge,
   the durable antireflective layer is electrostatically adsorbed directly onto the outer surface, and
   the durable antireflective layer comprises a uniform monolayer of silica nanoparticles attached to one or more other silica nanoparticles by $SiO_2$, wherein the uniform monolayer of silica nanoparticles is bonded directly to the inner surface of the substrate surface via a covalent $SiO_2$-particle network, wherein the uniform monolayer of silica nanoparticles is bonded directly to the outer surface of the substrate surface via a covalent $SiO_2$-particle network, wherein the silica nanoparticles have a diameter of about 100 to 200 nm.

2. The structure of claim 1, wherein the substrate is selected from the group consisting of: a silicon substrate, a gallium arsenide (GaAs) substrate, a gallium antimonide (GaSb) substrate, indium phosphide (InP), and gallium nitride (GaN).

3. The structure of claim 2, wherein the substrate is a silicon substrate.

4. The structure of claim 3, wherein the substrate comprises a plurality of the three-dimensional shapes.

5. The structure of claim 1, wherein the substrate is selected from a Buchner flask, a burette, a cold finger, a condenser, a cuvette, an Erlenmeyer flask, an Erlenmeyer bulb, a Florence flask, a Freidrichs condenser, a funnel, a pipette, a retort, a round bottom flask, a Schlenk flask, a separatory funnel, a Soxhlet extractor, a Thiele tube, a volumetric flask, a distillation glassware, a vial, a graduated cylinder, a test tube, a bottle, a jar, a spot plate, an evaporation dish, a boiling flask, a suction flask, a crystallization dish, a long condenser, a vacuum adapter, a distillation adapter, and a dropper.

6. The structure of claim 1, wherein the covalent $SiO_2$-particle network of the durable antireflective layer does not reduce a transmittance % of the antireflective layer by more than 2%, wherein the covalent $SiO_2$-particle network does not form a layer of $SiO_2$ over the surface of the uniform monolayer of silica nanoparticles, and wherein the durable antireflective layer has a total specular reflectance of about 2% or less.

* * * * *